United States Patent
Harada et al.

(10) Patent No.: US 8,042,256 B2
(45) Date of Patent: Oct. 25, 2011

(54) DYNAMOELECTRIC MACHINE AND MANUFACTURING METHOD FOR STATOR USED THEREIN

(75) Inventors: Yoshihiro Harada, Tokyo (JP); Toshiaki Kashihara, Tokyo (JP); Kensaku Kuroki, Tokyo (JP); Yasukazu Nishimura, Tokyo (JP); Shogo Okamoto, Tokyo (JP); Shinji Nishimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/038,050

(22) Filed: Mar. 1, 2011

(65) Prior Publication Data

US 2011/0146058 A1 Jun. 23, 2011

Related U.S. Application Data

(62) Division of application No. 11/828,700, filed on Jul. 26, 2007, now abandoned.

(30) Foreign Application Priority Data

Jan. 26, 2007 (JP) ................................. 2007-015961

(51) Int. Cl.
*H02K 15/02* (2006.01)
(52) U.S. Cl. ........................................................ 29/596
(58) Field of Classification Search ........... 310/216.136, 310/216.041, 400, 405; 29/596
See application file for complete search history.

(56) References Cited

U.S. PATENT DOCUMENTS

| | | | |
|---|---|---|---|
| 3,464,107 A | | 9/1969 | Geisenhaver |
| 3,490,143 A | * | 1/1970 | Hull ................................. 29/596 |
| 3,845,547 A | | 11/1974 | Reynolds |
| 4,188,712 A | | 2/1980 | Burns |
| 4,687,960 A | | 8/1987 | Frister |
| 4,914,934 A | * | 4/1990 | Fritzsche ......................... 72/135 |
| 5,010,638 A | * | 4/1991 | Lanfranco ....................... 29/596 |
| 5,686,773 A | | 11/1997 | Sakakibara et al. |
| 6,687,974 B1 | | 2/2004 | Asao et al. |
| 6,792,673 B2 | * | 9/2004 | Barrera et al. ................... 29/732 |

(Continued)

FOREIGN PATENT DOCUMENTS

JP 02-219443 9/1990

(Continued)

OTHER PUBLICATIONS

Japanese Office Action mailed on Jan. 19, 2010 (English translation submitted).

*Primary Examiner* — Burton Mullins
(74) *Attorney, Agent, or Firm* — Sughrue Mion, PLLC

(57) ABSTRACT

Respective divided segments of a collet are moved radially outward by moving an arbor axially. The respective divided segments thereby press an inner circumferential surface of a stator core of a stator from radially inside such that the stator is held coaxially by the collet. Next, shaping rollers are lowered so as to press an outer circumferential surface of the stator core. The stator is rotated by rotating the collet in that state. Thus, the inner circumferential surface of the stator core is compressed and plastically deformed so as to conform to the collet and the outer circumferential surface of the stator core is compressed and plastically deformed by the shaping rollers, correcting the inner circumferential surface and the outer circumferential surface of the stator core so as to be coaxial and so as to have a high degree of roundness.

5 Claims, 7 Drawing Sheets

U.S. PATENT DOCUMENTS

| | | | |
|---|---|---|---|
| 6,819,024 | B1 | 11/2004 | Fujita et al. |
| 7,129,614 | B2 | 10/2006 | Hahn et al. |
| 2006/0001328 | A1 | 1/2006 | Rau et al. |

FOREIGN PATENT DOCUMENTS

| | | |
|---|---|---|
| JP | 52-34301 A | 9/1993 |
| JP | 5-316696 A | 11/1993 |
| JP | 10-225027 A | 8/1998 |
| JP | 11-191942 | 7/1999 |
| JP | 2001-102236 | 4/2001 |
| JP | 2001-211619 A | 8/2001 |
| JP | 2001-218429 A | 8/2001 |
| JP | 2001-298885 A | 10/2001 |
| JP | 2004-023872 A | 1/2004 |
| JP | 2006-515144 A | 5/2006 |
| WO | 2005/064765 A1 | 7/2005 |

* cited by examiner

US 8,042,256 B2

DYNAMOELECTRIC MACHINE AND MANUFACTURING METHOD FOR STATOR USED THEREIN

CROSS REFERENCE TO RELATED APPLICATION

This is a divisional of U.S. application Ser. No. 11/828,700 filed Jul. 26, 2007, which claims priority from Japanese Application No. 2007-015961, filed on Jan. 26, 2006, in the Japan Patent Office, the entire disclosures of which are incorporated herein by reference.

BACKGROUND OF THE INVENTION

1. Field of the Invention

The present invention relates to a dynamoelectric machine such as an automotive alternator, etc., and a stator manufacturing method therefor, and particularly relates to a stator core construction and manufacturing method that improves circularity of an outer circumferential surface of a stator core that is fitted together with and supported by a case.

2. Description of the Related Art

A first conventional stator core that can be used in a dynamoelectric machine is prepared so as to have a cylindrical shape by curving and coiling up a band of steel plate in which a large number of slots and teeth have been formed along a first side and a large number of notches have been formed along a second side so as to be separated by a predetermined pitch from each other, and integrating it by welding (see a first patent document, for example). It has been claimed that superior roundness can be achieved in the stator core by forming the large number of notches along the second side of the band of steel plate so as to be separated by the predetermined pitch, and that circularity can be much improved particularly by forming the notches on surfaces behind the teeth.

A second conventional stator core is prepared so as to have a cylindrical shape by preparing a strip-shaped body bundle by laminating to a predetermined thickness strip-shaped bodies in which a large number of slots and teeth have been formed along a first side and integrating them by welding, bending the strip-shaped body bundle into a cylindrical shape, abutting end surfaces of the bent strip-shaped body bundle with each other, and integrating them by welding the abutted portions (see a second patent document, for example).

In the manufacturing method for this second conventional stator core, when the strip-shaped body bundle is bent into a cylindrical shape, bending in a vicinity of two end portions of the strip-shaped body bundle is less than in other portions, making abutted surfaces between the end surfaces of the bent strip-shaped body bundle misalign. If the abutted surfaces between the end surfaces of the bent strip-shaped body bundle are aligned forcibly and welded, roundness of the stator core deteriorates.

In order to solve the problems in the second conventional stator core that is described above, a third conventional stator core has been proposed in which the two end portions of the strip-shaped body bundle are bent so as to have a curvature that is approximately equal to a final curvature of the stator core before a step of bending the whole strip-shaped body bundle into a cylindrical shape (see a third patent document, for example). It has been claimed that because the two end portions of the strip-shaped body bundle are bent so as to have a curvature that is approximately equal to the final curvature of the stator core, the abutted surfaces between the end surfaces of the strip-shaped body bundle that has been bent into a cylindrical shape align when the strip-shaped body bundle is bent into a cylindrical shape, enabling roundness of the stator core to be improved.

First patent document: Japanese Patent Laid-Open No. HEI 10-225027 (Gazette)
Second patent document: Japanese Patent Laid-Open No. SHO 52-34301 (Gazette)
Third patent document: Japanese Patent Laid-Open No. 2001-298885 (Gazette)

In the first conventional stator core, because the large number of notches are formed along the second side of the band of steel plate, when the band of steel plate is curved and coiled up, notched portions become bend points, and an outer circumferential surface of the bent stator core becomes multangular. Consequently, it is necessary to adjust curving resistance (tensile resistance) of the band of steel plate while coiling it up so that the outer circumferential surface shape does not become multangular, making the manufacturing process for the stator core complicated. Because the band of steel plate that has been coiled up into a cylindrical shape is integrated by welding it at the notched portions, even if the band of steel plate has been coiled up so as to have good roundness, the band of steel plate may deform locally due to heat during welding, reducing its roundness.

In the third conventional stator core, the two end portions of the strip-shaped body bundle are bent so as to have a predetermined curvature before the step of bending the whole strip-shaped body into a cylindrical shape, but satisfactory roundness has not been achieved.

In addition, in the first through third conventional stator cores, tension continues to act on the steel plates that constitute the stator cores after they have been prepared. When a dynamoelectric machine that incorporates such a stator core is mounted to a vehicle, the stator core is subjected to vehicle vibration, and there has therefore been a danger that cracking or other damage may arise at positions on the steel plates where such tension is acting.

SUMMARY OF THE INVENTION

The present invention aims to solve the above problems and an object of the present invention is to provide a dynamoelectric machine that can achieve high performance by improving the roundness of a stator core that is fitted together with and supported by a case.

Another object of the present invention is to provide a method for manufacturing a stator that can be used in a dynamoelectric machine that enables roundness of a stator core to be improved using simple equipment.

In order to achieve the above object, according to one aspect of the present invention, there is provided a dynamoelectric machine including: first and second brackets that each have an interfitting portion that is formed on an inner circumferential portion of an opening end surface, the interfitting portion being constituted by an annular abutting axial end surface that is perpendicular to a central axis, and an interfitting circumferential surface that has a cylindrical surface that is formed on an outer circumferential portion of the abutting axial end surface so as to be coaxial to the central axis, and the first and second brackets being disposed such that the openings face each other; a shaft that is rotatably supported at central axial positions of the first and second brackets; a rotor that is fixed to the shaft, and that is disposed inside the first and second brackets; a stator including: a cylindrical stator core that is prepared by laminating a thin magnetic plate, and in which a plurality of slots that open on an inner circumferential side are formed so as to line up in a circumferential direction; and a stator winding that is installed in the stator core, the stator being mounted to the first and second brackets so as to surround the rotor such that two axial end portions of an outer circumferential surface of the stator core are fitted together with the interfitting circumferential surfaces and such that outer circumferential portions of two axial end surfaces of the stator core are pressed and held between the abutting axial end surfaces from two axial ends. The laminated thin magnetic plate is consolidated and integrated by a thin sheet consolidating weld portion that is formed on an outer circumferential surface of the stator core so as to extend from a first axial end to a second end, and two axial end portions of an outer circumferential surface of the stator core are constituted by a compressed and plastically worked surface.

According to the present invention, because the two axial end portions of the outer circumferential surface of the stator core are constituted by the compressed and plastically worked surface, the degree of roundness of the two axial end portions of the outer circumferential surface of the stator core that are fitted together with the interfitting circumferential surfaces of the first and second brackets is increased, and the stator is supported by the first and second brackets so as to be coaxial with the shaft. Thus, a gap between the stator and the rotor is made uniform, enabling a high-performance dynamoelectric machine to be achieved.

DETAILED DESCRIPTION OF THE PREFERRED EMBODIMENTS

Embodiment 1

Figure 1:
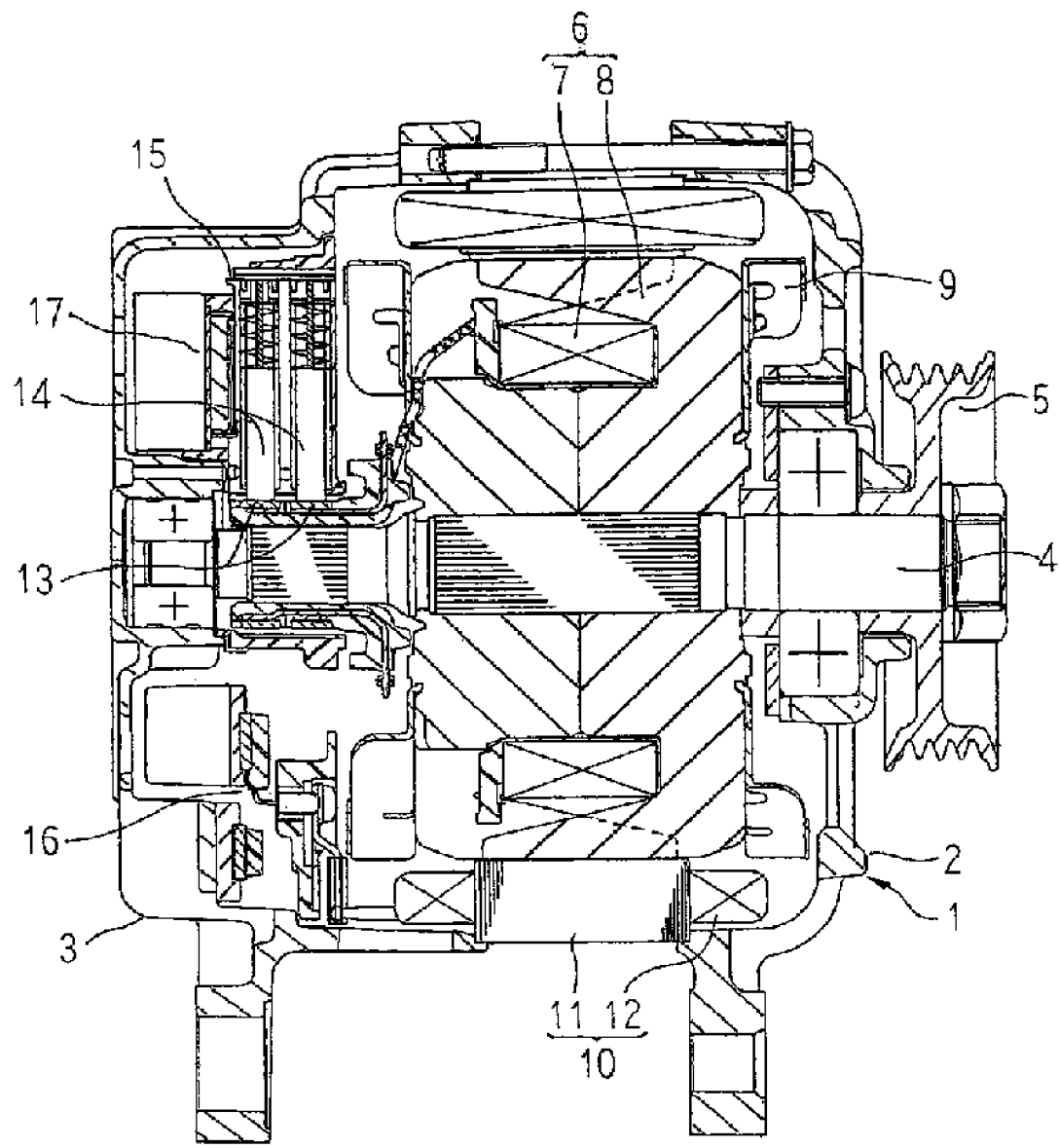
FIG. 1 is a cross section of an automotive alternator according to Embodiment 1 of the present invention.
Figure 2:
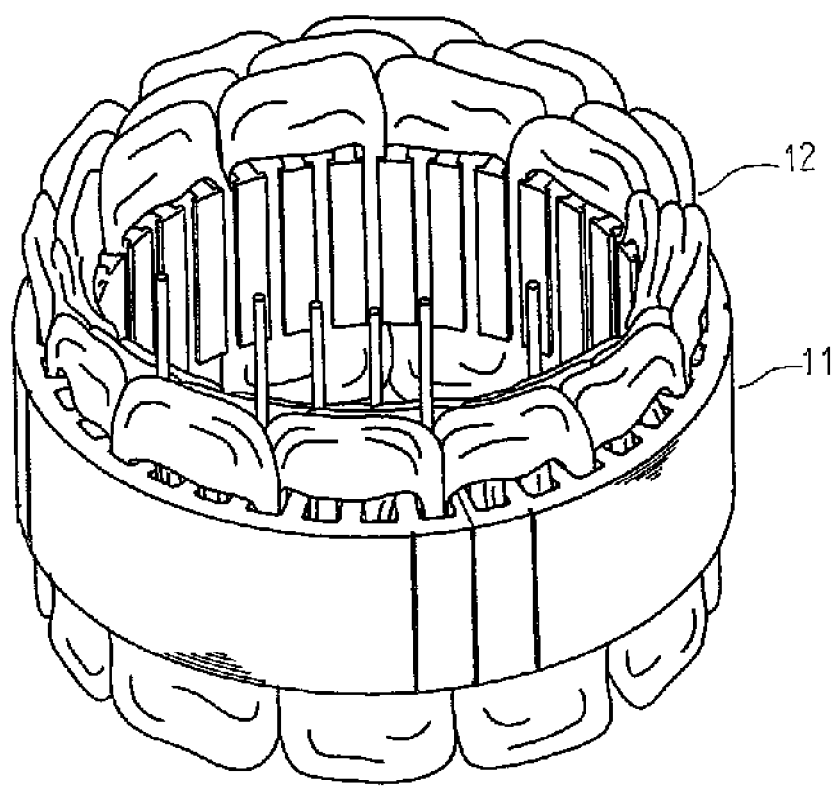
FIG. 2 is a perspective of a stator that can be used in the automotive alternator according to Embodiment 1 of the present invention.
Figure 3:
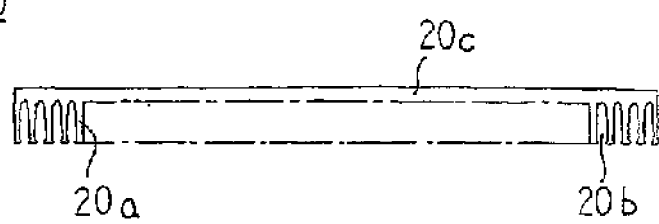
FIG. 3 is a diagram that explains a step of punching thin strip-shaped magnetic plates that constitute a stator core that can be used in the automotive alternator according to Embodiment 1 of the present invention.
Figure 4:
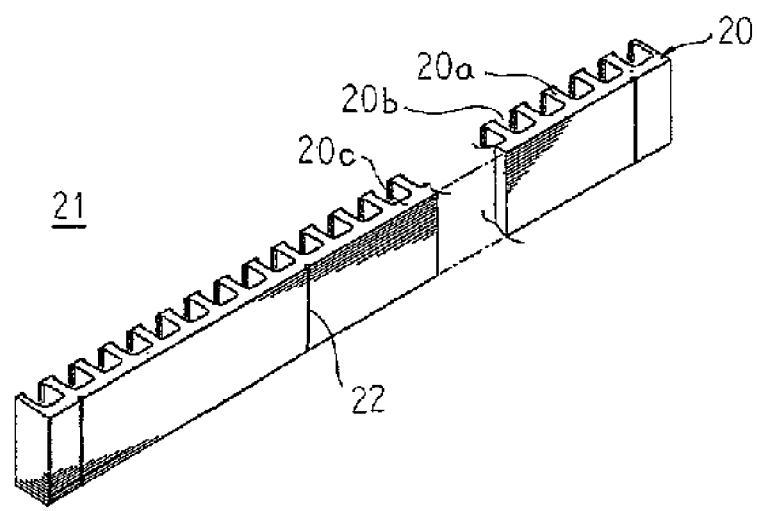
FIG. 4 is a perspective of a laminated body of thin strip-shaped magnetic plates that is obtained in a process for manufacturing the stator that can be used in the automotive alternator according to Embodiment 1 of the present invention.
Figure 5:
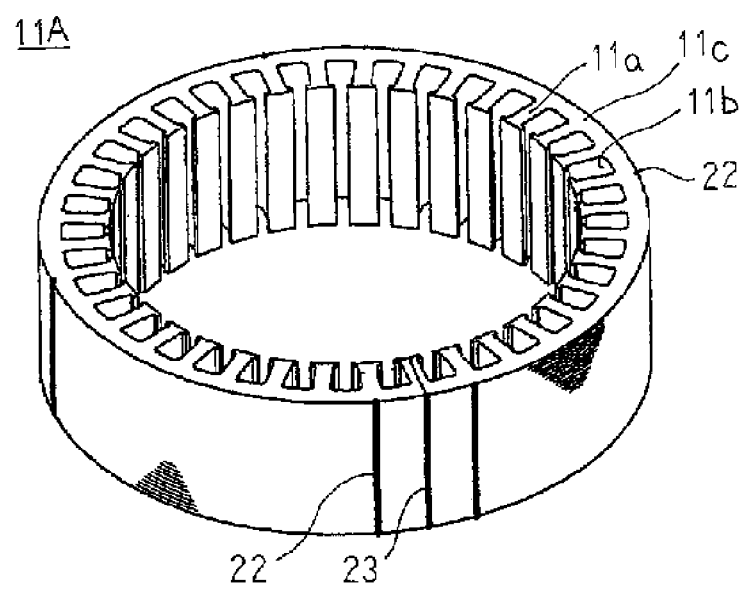
FIG. 5 is a perspective of a stator core that is obtained in the process for manufacturing the stator that can be used in the automotive alternator according to Embodiment 1 of the present invention.
Figure 6:
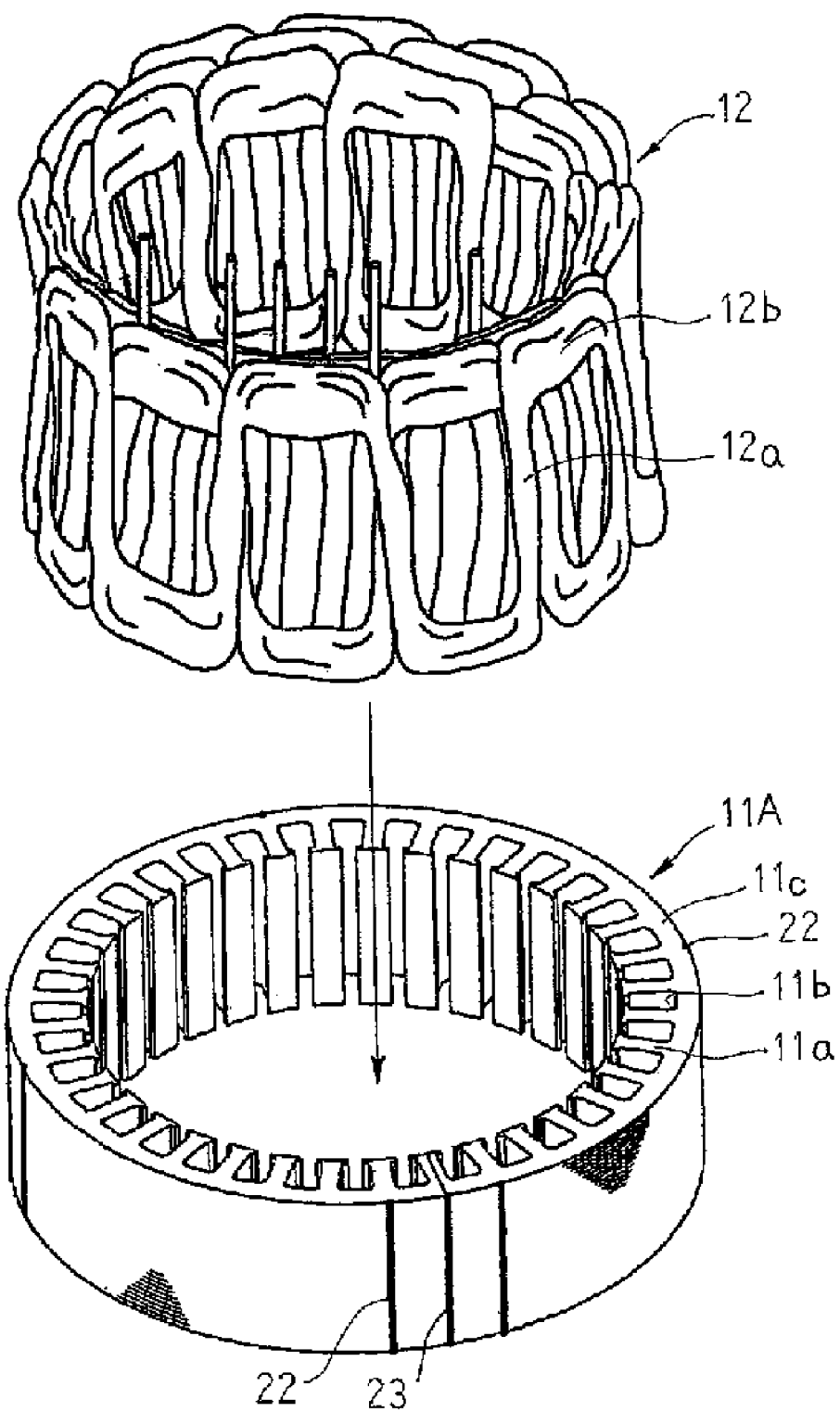
FIG. 6 is a diagram that explains installation of a stator winding into the stator core in a stator manufacturing method that can be used in the automotive alternator according to Embodiment 1 of the present invention.
Figure 7:
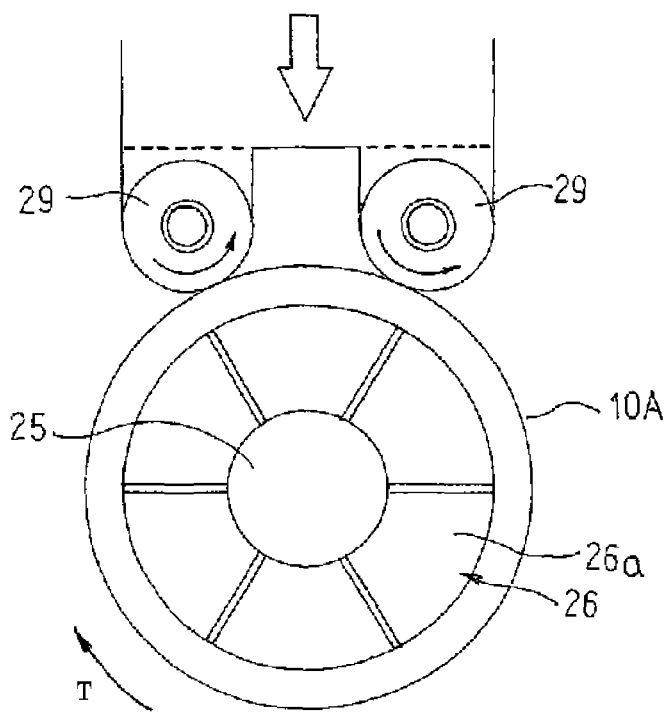
FIG. 7 is a diagram that explains a roundness correcting step for the stator core in a stator manufacturing method that can be used in the automotive alternator according to Embodiment 1 of the present invention.
Figure 8:
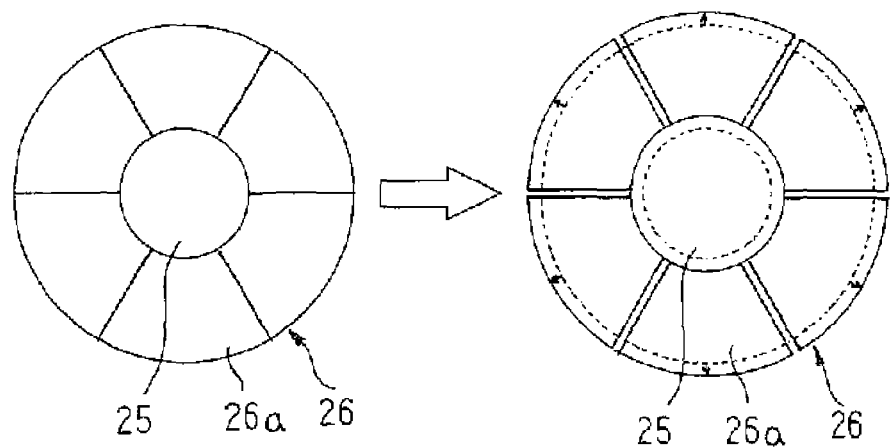
FIG. 8 is a diagram that explains operation of a collet in the roundness correcting step for the stator core.
Figure 9:
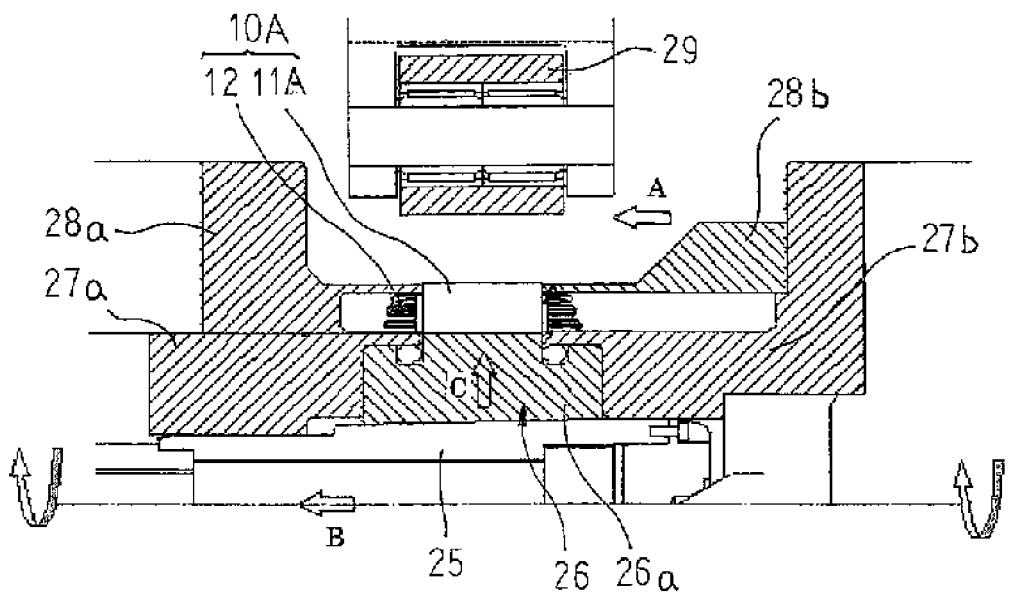
FIG. 9 is a cross section that explains a state in which the stator is set in a roundness correcting apparatus in the stator manufacturing method that can be used in the automotive alternator according to Embodiment 1 of the present invention.

FIG. 1 is a cross section of an automotive alternator according to Embodiment 1 of the present invention, and FIG. 2 is a perspective of a stator that can be used in the automotive alternator according to Embodiment 1 of the present invention. FIG. 3 is a diagram that explains a step of punching thin strip-shaped magnetic plates that constitute a stator core that can be used in the automotive alternator according to Embodiment 1 of the present invention, FIG. 4 is a perspective of a laminated body of thin strip-shaped magnetic plates that is obtained in a process for manufacturing the stator that can be used in the automotive alternator according to Embodiment 1 of the present invention, FIG. 5 is a perspective of a stator core that is obtained in the process for manufacturing the stator that can be used in the automotive alternator according to Embodiment 1 of the present invention, FIG. 6 is a diagram that explains installation of a stator winding into the stator core in a stator manufacturing method that can be used in the automotive alternator according to Embodiment 1 of the present invention, FIG. 7 is a diagram that explains a roundness correcting step for the stator core in a stator manufacturing method that can be used in the automotive alternator according to Embodiment 1 of the present invention, FIG. 8 is a diagram that explains operation of a collet in the roundness correcting step for the stator core, and FIG. 9 is a cross section that explains a state in which the stator is set in a roundness correcting apparatus in the stator manufacturing method that can be used in the automotive alternator according to Embodiment 1 of the present invention.

In FIGS. 1 and 2, an automotive alternator that functions as a dynamoelectric machine includes: a case 1 that is constituted by a front bracket 2 that functions as a first bracket and a rear bracket 3 that functions as a second bracket that are each approximately bowl-shaped and made of aluminum; a shaft 4 that is rotatably supported at a central axial position of the case 1; a pulley 5 that is fixed to an end portion of the shaft 4 that projects outward at a front end of the case 1; a rotor 6 that is fixed to the shaft 4 and that is accommodated inside the case 1; fans 9 that are fixed to two axial end surfaces of the rotor 6; a stator 10 that is fixed to an inner wall surface of the case 1 so as to surround an outer circumference of the rotor 6; slip rings 13 that are fixed to a rear end of the shaft 4 so as to supply electric current to the rotor 6; a pair of brushes 14 that are disposed inside the case 1 so as to slide on the slip rings 13; a brush holder 15 that houses the brushes 14; a rectifier 16 that is electrically connected to the stator 10 so as to rectify alternating current that is generated in the stator 10 into direct current; and a regulator 17 that adjusts magnitude of alternating voltage that is generated in the stator 10.

The rotor 6 is constituted by: a field winding 7 that generates magnetic flux on passage of electric current; and a pole core 8 that is disposed so as to cover the field winding 7 and in which magnetic poles are formed by the magnetic flux. The stator 10 includes: a cylindrical stator core 11; and a stator winding 12 that is wound onto stator core 11 and in which alternating current arises due to changes in the magnetic flux from the field coil 7 that accompany rotation of the rotor 6.

Next, a method for manufacturing the stator 10 will be explained with reference to FIGS. 3 through 9.

First, thin strip-shaped magnetic plates 20 are punched from a rolled steel plate by a pressing machine (not shown). As shown in FIG. 3, the thin strip-shaped magnetic plates 20 have a flat rectangular shape, and tooth portions 20*a* are formed so as to project outward from a core back portion 20*c* in a first width direction at a predetermined pitch in a longitudinal direction. Thus, slot portions 20*b* are formed between the tooth portions 20*a* so as to be open in the first width direction of the thin strip-shaped magnetic plates 20. Widths of the tooth portions 20*a* at first and second longitudinal end portions are half the width of other tooth portions 20*a*. Lengths of the thin strip-shaped magnetic plates 20 match a circumferential length of the stator core 11.

Next, a rectangular parallelepiped laminated body 21 is prepared by laminating the punched thin strip-shaped magnetic plates 20 to a thickness equal to an axial thickness of the stator core 11 with the tooth portions 20*a*, the slot portions 20*b*, and the core back portions 20*c* stacked on top of each other. Next, the laminated thin strip-shaped magnetic plates 20 are integrated by welding outer wall surfaces of the core back portions 20*c* of the thin strip-shaped magnetic plates 20 from a first end to a second end in a direction of lamination of the laminated body 21 at positions that divide a longitudinal direction of the laminated body 21 into four equal parts. The laminated thin strip-shaped magnetic plates 20 are also integrated by welding the outer wall surfaces of the core back portions 20*c* of each of the thin strip-shaped magnetic plates 20 from a first end to a second end in the direction of lamination of the laminated body 21 at positions that face second tooth portions 21*a* from first and second longitudinal ends of the laminated body 21. Thus, as shown in FIG. 4, the rectangular parallelepiped laminated body 21 is prepared by integrating the laminated thin strip-shaped magnetic plates 20 using five thin sheet consolidating weld portions 22.

Next, only the two end portions of the laminated body 21 are bent so as to have a curvature that is equal to the radius of curvature of the stator core 11, and then the whole of the laminated body 21 is bent into a cylindrical shape such that the openings of the slot portions 20*b* face inward.

Then, two end surfaces of the laminated body 21 that has been bent into the cylindrical shape are abutted and integrated by welding using laser welding, for example, to obtain the cylindrical stator core 11A that is shown in FIG. 5. The numeral 23 in FIG. 5 indicates the abutted weld portion on the stator core 11A. The tooth portions 20*a* of the thin strip-shaped magnetic plates 20 are stacked in the direction of lamination (axial direction) so as to constitute teeth 11*a*, the slot portions 20*b* line up in the direction of lamination so as to constitute slots 11*b*, and the core back portions 20*c* are stacked in the direction of lamination so as to constitute a core back 11*c*.

Next, as shown in FIG. 6, a stator winding 12 that has been prepared so as to have an annular shape is mounted into the stator core 11A from axially outside the stator core 11A. Slot-housed portions 12*a* of the stator winding 12 are thereby housed in each of the slots 11*b*, and coil ends 12*b* that link the slot-housed portions 12*a* are disposed at two axial ends of the stator core 11A. Moreover, although not shown, insulators are mounted into each of the slots 11*b* of the stator core 11A so as to ensure insulation between the stator core 11A and the stator winding 12.

Next, a roundness correcting step for the stator core 11A is performed on the stator 10A that has been assembled by mounting the stator winding 12 to the stator core 11A in this manner.

Here, a holding apparatus for the stator core 11A in the roundness correcting step includes an arbor 25 and a collet 26, as shown in FIG. 8. The arbor 25 is prepared so as to have a truncated conical body that has an outer circumferential surface that is inclined slightly, and is configured so as to be movable axially. The collet 26 is configured such that a thick-walled cylindrical body that has an outer circumferential surface that is a cylindrical surface that has a high degree of roundness and that has an inner circumferential surface that is a truncated conical surface that has an angle of inclination that is equal to that of the outer circumferential surface of the arbor 25 is divided into six equal sections circumferentially. The collet 26 is mounted so as to be fitted over the arbor 25 such that divided segments 26*a* are each moved radially by moving the arbor 25 axially with axial movement of the collet 26 restricted.

First, as shown in FIG. 9, the collet 26 is set in the roundness correcting apparatus with the divided segments 26*a* placed in close contact with each other and mounted so as to be fitted over the arbor 25. The stator 10A is similarly set in the roundness correcting apparatus so as to surround the collet 26. Thus, two end surfaces of the collet 26 contact a pair of collet braces 27*a* and 27*b* such that movement of the collet 26 in an axial direction (direction of arrow B) is restricted. Two end surfaces of the core back 11*c* of the stator core 11A are similarly placed in surface contact with annular end surfaces of a pair of stator braces 28*a* and 28*b* such that movement of the stator 10A in an axial direction (direction of arrow A) is restricted.

Next, the arbor 25 is moved axially (direction of arrow B) so as to engage in the collet 26. At this time, circumferential gaps expand as the divided segments 26*a* of the collet 26 move radially outward (direction of arrow C). Thus, the six divided segments 26*a* move radially outward gradually and uniformly and press tip end surfaces of the teeth 11*a* of the stator core 11A. Outer circumferential surfaces (curved surfaces) of the divided segments 26*a* are thereby placed in contact with inner circumferential surfaces of the stator core 11A (tip end surfaces of the teeth 11*a*) such that the stator 10A is held so as to be coaxial to the arbor 25 and the collet 26.

Next, a pair of shaping rollers 29 descend so as to be placed in close contact with an entire axial length of an outer circumferential surface of the stator core 11A and press with a predetermined pressing force. The arbor 25, the collet 26, the stator 10A, the collet braces 27*a* and 27*b*, and the stator braces 28*a* and 28*b* are rotated in this state in the direction of arrows T around a central axis of the collet 26, as shown in FIG. 7. Central axes of the shaping rollers 29 are parallel to the central axis of the collet 26. The inner circumferential surface and the outer circumferential surface of the stator core 11A are shaped thereby. Here, the inner circumferential surface of the stator core 11A is compressed and plastically deformed so as to conform to the outer circumferential surfaces of the divided segments 26*a*, and the outer circumferential surface of the stator core 11A is simultaneously compressed and plastically deformed, correcting the outer circumferential surface and the inner circumferential surface of the stator core 11A so as to be coaxial and so as to have a high degree of roundness. In this roundness correcting step, ruptured surfaces do not arise on the surfaces that have been compressed and plastically deformed because the compressive plastic working is performed using the shaping rollers 29. Here, the surface on which compressive plastic working has been performed without generating ruptured surfaces that is achieved by the present compression and plastic working will be called a "compressed and plastically worked surface".

After completion of the roundness correcting step, the collet braces 27a and 27b and the stator braces 28a and 28b are removed, the arbor 25 is moved in a reverse direction to the direction of arrow B, and the stator 10 that has been corrected for roundness is removed from the roundness correcting apparatus.

Figure 10A:
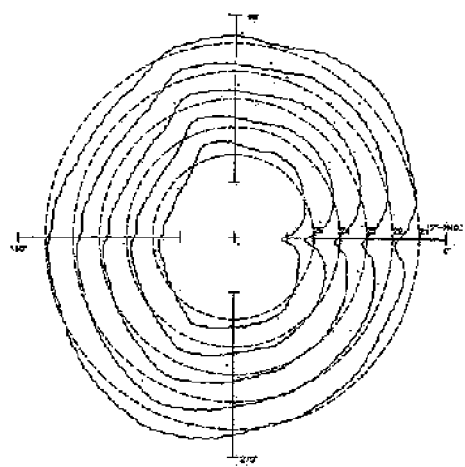
FIGS. 10A and 10B are diagrams that show measurements of roundness of an inner circumferential surface of the stator core that can be used in the automotive alternator according to Embodiment 1 of the present invention.
Figure 10B:
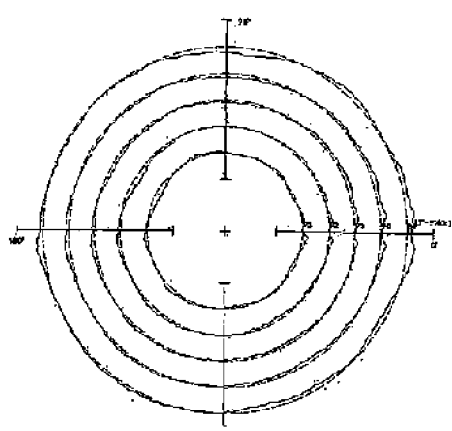

Now, measurements of roundness of the inner circumferential surface of the stator 10A (the stator core 11A) before roundness correction and the stator 10 (the stator core 11) after roundness correction are shown in FIGS. 10A and 10B. FIG. 10A concentrically plots measurements around a circumference of the inner circumferential surface of the stator 10A (the stator core 11A) for each of five points separated by a predetermined spacing axially, and FIG. 10B concentrically plots measurements around a circumference of the inner circumferential surface of the stator 10 (the stator core 11) for each of five points separated by a predetermined spacing axially.

From FIG. 10A, it can be seen that warping arises on the inner circumferential surface of the stator core 11A that has been obtained by bending the laminated body 21 into a cylindrical shape, and a satisfactory degree of roundness could not be achieved. From FIG. 10B, on the other hand, it can be seen that a high degree of roundness that deviated by 100 μm or less has been achieved in the inner circumferential surface of the stator core 11 to which roundness correction was applied. In other words, a stator (or stator core) that has a high degree of roundness can be obtained by performing the present roundness correction.

Next, an insulating resin such as a varnish, etc., is impregnated into the slots 11b such that the slot-housed portions 12a of the stator winding 12 are fixed to the inner wall surfaces of the slots 11b with the insulators interposed. The stator winding 12 is thereby prevented from moving relative to the stator core 1. An insulating resin such as an epoxy resin, etc., is also applied to two end surfaces and the outer circumferential surface of the stator core 11 to obtain the stator 10.

Next, a method for mounting a stator 10 that has been prepared in this manner will be explained.

First, interfitting portions that are constituted by abutting axial end surfaces 2a and 3a and interfitting circumferential surfaces 2b and 3b are formed on inner circumferential edge portions of opening end surfaces of the front bracket 2 and the rear bracket 3. The abutting axial end surfaces 2a and 3a are formed so as to have annular shapes that have flat surfaces that are parallel to a plane that is perpendicular to a central axis of the shaft 4 and that are coaxial with the shaft 4. The interfitting circumferential surfaces 2b and 3b are formed on outer circumferential portions of the abutting axial end surfaces 2a and 3a so as to have cylindrical surfaces that are coaxial with the shaft 4.

Figure 11:
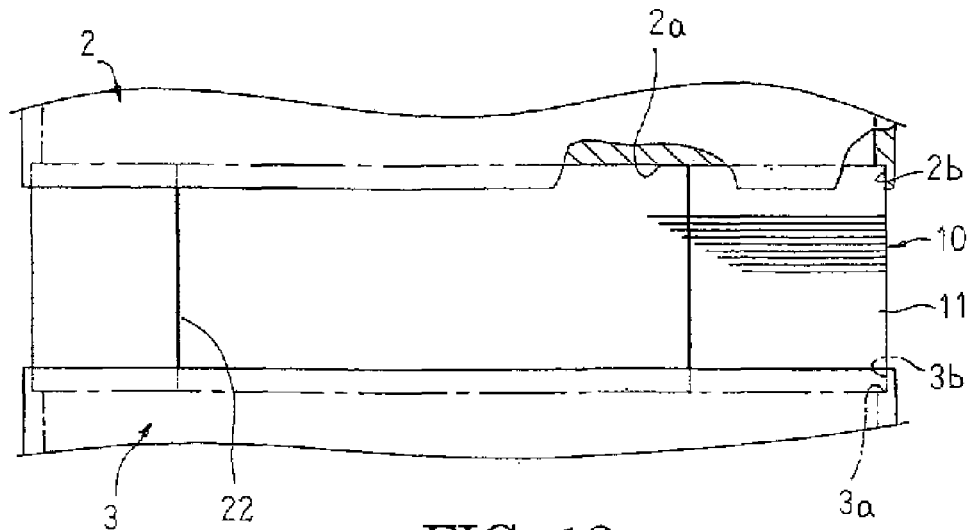
FIG. 11 is a diagram that explains a mounted state of the stator in the automotive alternator according to Embodiment 1 of the present invention.

Next, the two axial ends of the stator core 11 of the stator 10 are fitted into the interfitting circumferential surfaces 2b and 3b of the front bracket 2 and the rear bracket 3, as shown in FIG. 11. Then, the front bracket 2 and the rear bracket 3 are fastened by a fastening bolt such that two axial end surfaces of the core back 11c of the stator core 11 are pressed and held between the abutting axial end surfaces 2a and 2b. The stator 10 is thereby mounted to the case 1 so as to surround the rotor 6 such that concentricity with the shaft 4 is increased by fitting the outer circumferential surfaces of the stator core 11 together with the interfitting circumferential surfaces 2b and 3b.

Thus, according to Embodiment 1, because the outer circumferential surface of the stator core 11 is formed so as to have a compressed and plastically worked surface, the degree of roundness of the outer circumferential surface of the stator core 11 can be raised, making it unnecessary to apply a cutting process to outer circumferential portions at the two axial ends of the stator core 11 that will be fitted together with the case 1. Thus, shavings that accompany cutting processes will not adhere to the surfaces of the stator core 11 that fit together with the case 1 and cause concentricity of the stator core relative to the case 1 to deteriorate in the mounted state. Damage to insulating coatings that coat the conductor wires of the stator winding 12 that results from adhesion of the shavings is also eliminated. In addition, bulky protective covers that cover the coil ends 12b of the stator winding 12 that project out from the axial end surfaces of the stator core 11 were required during cutting processes, but bulky equipment of this kind also becomes unnecessary.

An ironing step that requires the application of working oil also becomes unnecessary in order to increase the degree of roundness. Thus, the subsequent steps of applying insulating resins to the stator 10 are facilitated because working oil has not adhered. The insulating resins are applied in order to meet the high durability that is demanded of automotive alternators, and types of insulating resin and positions of application are many and varied. If working oil has been applied, steps for cleaning up and volatizing the working oil are required before the steps of applying the insulating resins.

When conventional ironing is applied to a stator, problems such as thin magnetic plates that constitute axial end portions of the stator core collapsing in one axial direction, etc., are more likely to arise. When collapse of the thin magnetic plates arises, shaping work is required on the collapsed thin magnetic plates before the steps of applying the insulating resins. In the present roundness correcting process, because the inner circumferential surface of the stator core is held while the outer circumferential surface of the stator core is pressed radially inward, the occurrence of collapsing of the thin magnetic plates is avoided, making shaping work such that described above unnecessary. Because this collapsing of the thin magnetic plates occurs more easily as tooth width becomes narrower, the effects that result from the present roundness correcting process are more pronounced if applied to stators in which the slots are formed at a ratio of two slots per phase per pole.

Now, in order to prevent movement of the stator winding 12 relative to the stator core 11, it is desirable for the insulating resin such as a varnish, etc., that is applied inside the slots 11b to be applied only inside the slots 11b. Specifically, if the insulating resin adheres to axial end surfaces of the stator core 11 or inner circumferential surfaces of the teeth 11a, etc., fitting problems between the stator core 11 and the case 1, or interference between the stator core 11 and the rotor 6, etc., may occur. Then, steps for peeling off the insulating resin that has adhered to the axial end surfaces of the stator core 11 or the inner circumferential surfaces of the teeth 11a, etc., are required. In addition, there is also a risk that such insulating resin peeling work may damage the insulating coatings that coat the conductor wires of the stator winding 12. By making such insulating resin peeling steps unnecessary, decreases in reliability are suppressed, enabling manufacturing costs to be reduced.

Furthermore, because the outer circumferential surface of the stator core 11A that is rotated around its axis by the shaping rollers 29 is pressed radially, the outer circumferential surface of the stator core 11A is compressed and plastically deformed, alleviating any tension that may have been acting on the thin strip-shaped magnetic plates 20 due to bending. Thus, if an automotive alternator into which the stator core 11 has been incorporated after the present roundness correcting process is mounted to a vehicle, the occurrence of cracking or other damage to the thin strip-shaped magnetic plates 20 is suppressed even if the stator core 11 is subjected to vehicle vibration.

Steps of welding the laminated thin strip-shaped magnetic plates 20 are performed before the roundness correcting process. In other words, because the roundness correcting process is performed on the stator core 11A in which the degree of roundness has been reduced as a result of welding, a stator core 11 can be obtained that has a high degree of roundness without being affected by the decreases in the degree of roundness that result from welding.

Because the degree of roundness of the inner circumferential surface of the stator core 11 can be increased, irregularities in a gap between the rotor 6 and the stator 10 can be suppressed when the rotor 6 and the stator 10 is mounted to the case 1. Thus, a high-performance automotive alternator can be achieved in which the occurrence of declines in output, noise deterioration, etc., that results from irregularities in that gap are suppressed.

Because the stator core 11 is mounted such that radially-outer sides of two axial end portions are held in the case 1 from two axial ends, the concentricity of the stator core 11 relative to the case 1 depends on the degree of roundness of the two axial ends of the outer circumferential surface of the stator core 11. Here, if the concentricity between the inner circumferential surface and the outer circumferential surface of the stator core 11 is poor, irregularities in the gap between the rotor 6 and the stator 10 cannot be suppressed even if the degrees of roundness of the outer circumferential surface and the inner circumferential surface of the stator core 11 are raised. However, in Embodiment 1, because the inner circumferential surface and the outer circumferential surface of the stator core 11 are simultaneously compressed and plastically deformed by the pressure from the shaping rollers 29 onto the outer circumferential surface of the stator core 11, the degrees of roundness of the inner circumferential surface and the outer circumferential surface of the stator core 11 are increased and concentricity between the inner circumferential surface and the outer circumferential surface can also be ensured with high precision. Thus, irregularities in the gap between the rotor 6 and the stator 10 can be suppressed, enabling declines in output, noise deterioration, etc., that results from nonuniformity of the gap between the rotor 6 and the stator 10 to be reliably suppressed.

When the outer circumferential surface of the stator core 11A is pressed radially by the shaping rollers 29, gaps are more likely to arise between the thin strip-shaped magnetic plates 20 at the two axial ends of the stator core 11A. Because the thin sheet consolidating weld portions 22 are formed so as to have a predetermined spacing, gaps are particularly more likely to arise between the thin strip-shaped magnetic plates 20 at portions between the thin sheet consolidating weld portions 22. If an automotive alternator to which stator of this kind has been mounted is mounted to a vehicle, there is a risk that mud, etc., may penetrate into the gaps between the thin strip-shaped magnetic plates 20, giving rise to rust and making power generation fail. However, in the present roundness correcting method, because the annular end surfaces of the stator braces 28a and 28b contact the axial end surfaces of the core back 11c of the stator core 11A around its entire circumference, the occurrence of gaps between the thin strip-shaped magnetic plates 20 at the two axial ends of the stator core 11A is suppressed. In an automotive alternator to which the present stator 10 has been mounted, the occurrence of power generation failure such as that described above can be prevented, enabling reliability to be increased.

Moreover, in Embodiment 1 above, a stator winding 12 that has been prepared into an annular shape is mounted to the stator core 11A, but an annular stator winding may also be prepared so as to be developed into a flat shape, the flat stator winding may be mounted into the laminated body 21, and the laminated body 21 into which the stator winding has been mounted may be bent into a cylindrical shape. In that case, the stator winding is more easily mounted than when a stator winding is mounted into a cylindrical stator core, enabling productivity of the stator to be improved, and damage to insulating coatings that coat the conductor wires of the stator winding is also less likely to occur, enabling electrical insulation to be improved. The stator winding may also be prepared by inserting U-shaped conductor segments into each of the slots 11b and connecting open end portions thereof.

In Embodiment 1 above, the entire axial length of the outer circumferential surface of the stator core 11A is pressed by the shaping rollers 29, but the outer circumferential surface of the stator core 11A may also be pressed by the rollers only on the two axial end portions that are fitted into the case 1.

In Embodiment 1 above, two shaping rollers 29 are used, but the shaping rollers 29 are not limited to that number.

In Embodiment 1 above, the stator core 11A is prepared by bending into a cylindrical shape a laminated body 21 that has a length that is equal to the circumferential length of the stator core 11, but a cylindrical stator core may also be prepared by preparing laminated bodies that have lengths that divide the circumferential length of the stator core 11 into a plurality of sections, curving each of the laminated bodies into an arc shape, then welding and integrating the curved laminated bodies.

In Embodiment 1 above, the outer circumferential surface of the core back portions 21c of the laminated body 21 is explained as being flat, but notches may also be disposed provided that they are small enough not to hinder the shaping rollers 29 in the subsequent roundness correcting step.

In Embodiment 1 above, the laminated thin strip-shaped magnetic plates 20 are integrated by disposing five thin sheet consolidating weld portions 22, but the thin sheet consolidating weld portions 22 are not limited to this number, or to these positions.

In Embodiment 1 above, the collet 26 is configured so as to be divided into six divided segments 26a, but the collet is also not limited to this number of sections.

Embodiment 2

In Embodiment 1 above, the rectangular parallelepiped laminated body 21 is prepared by laminating and integrating a predetermined number of thin strip-shaped magnetic plates 20 and the stator core 11A is subsequently prepared by bending the laminated body 21 into a cylindrical shape, abutting end surfaces of the laminated body 21 that has been bent into the cylindrical shape, and integrating it by welding.

Figure 12:
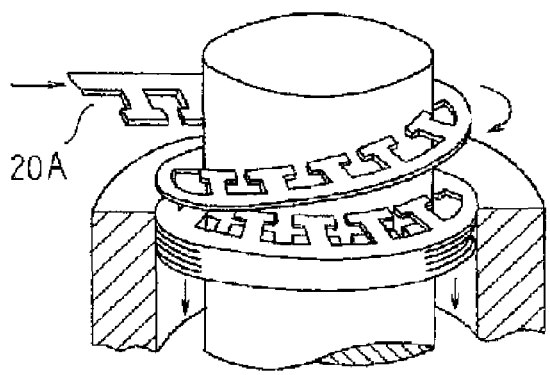
FIG. 12 is a perspective that explains a step of manufacturing a laminated body in a stator manufacturing method that can be used in an automotive alternator according to Embodiment 2 of the present invention.

In Embodiment 2, as shown in FIG. 12, a cylindrical stator core is prepared by curving and coiling up a long thin strip-shaped magnetic plate 20A, and integrating it by welding. A stator winding is installed in the stator core that has been prepared in this manner, and then a roundness correcting process is applied in a similar manner to that of Embodiment 1 above.

Consequently, similar effects to those in Embodiment 1 above can also be achieved in Embodiment 2.

When the long thin strip-shaped magnetic plate 20A is coiled up into a helical shape, large tensile forces act on outer circumferential portions of the thin strip-shaped magnetic plate 20A, making gaps more likely to arise between the thin strip-shaped magnetic plate 20A after lamination. However, because the roundness correcting process is applied to the stator core that has been prepared by coiling up the thin strip-shaped magnetic plate 20A into a helical shape, gaps between the thin strip-shaped magnetic plate 20A are relieved as the degree of roundness is increased. Consequently, ironing, etc., is no longer necessary, preventing the occurrence of roll over at the surfaces that fit together with the case that results from ironing, enabling the stator core to be supported in the case coaxially.

Embodiment 3

In Embodiment 1 above, the rectangular parallelepiped laminated body 21 is prepared by laminating and integrating a predetermined number of thin strip-shaped magnetic plates 20 and the stator core 11A is subsequently prepared by bending the laminated body 21 into a cylindrical shape, abutting end surfaces of the laminated body 21 that has been bent into the cylindrical shape, and integrating it by welding.

Figure 13:
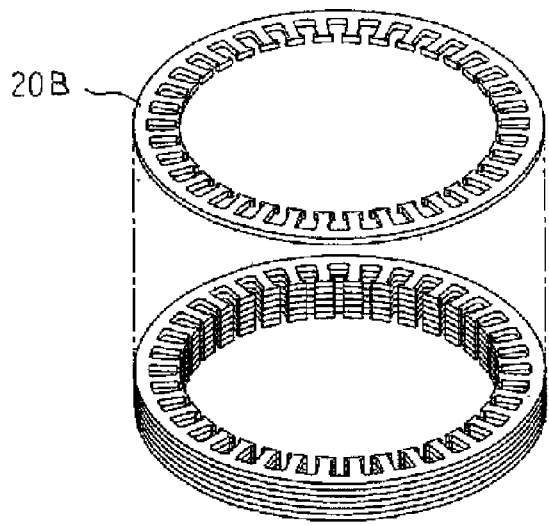
FIG. 13 is a perspective that explains a step of manufacturing a laminated body in a stator manufacturing method that can be used in an automotive alternator according to Embodiment 3 of the present invention.

In Embodiment 3, as shown in FIG. 13, a cylindrical stator core is prepared by laminating a predetermined number of annular thin magnetic plates 20B that have been punched from a rolled steel plate, and integrating them by welding. A stator winding is installed in the stator core that has been prepared in this manner, and then a roundness correcting process is applied in a similar manner to that of Embodiment 1 above.

Consequently, similar effects to those in Embodiment 1 above can also be achieved in Embodiment 3.

Moreover, in each of the above embodiments, explanations are given for automotive alternators, but similar effects can also be achieved if the present invention is applied to dynamoelectric machines such as automotive alternating-current motors, automotive alternating-current generator-motors, etc.

What is claimed is:

1. A dynamoelectric stator manufacturing method for manufacturing a dynamoelectric stator that has:
    a cylindrical stator core that is prepared by laminating a thin magnetic plate, and in which a plurality of slots that open on an inner circumferential side are formed so as to line up in a circumferential direction; and
    a stator winding that is installed in said stator core,
    said dynamoelectric stator manufacturing method comprising steps of:
    preparing a cylindrical stator core by consolidating and integrating said laminated thin magnetic plate by welding said laminated thin magnetic plate so as to extend from a first end portion to a second end portion in a direction of lamination;
    holding said stator core in a holding apparatus by pressing an inner circumferential surface of said cylindrical stator core radially outward using a curved surface that has a shape that is formed by dividing a cylindrical surface into a plurality of sections circumferentially; and
    shaping two axial end portions of an outer circumferential surface of said stator core by pressing shaping rollers that are rotatable around axes of rotation that are parallel to a central axis of said cylindrical surface onto said two axial end portions of said outer circumferential surface of said stator core while rotating said holding apparatus around said central axis of said cylindrical surface with said stator core in a held state.

2. A dynamoelectric stator manufacturing method according to claim 1, wherein an inner circumferential surface of said stator core is shaped simultaneously in said step of shaping said two axial end portions of said outer circumferential surface of said stator core.

3. A dynamoelectric stator manufacturing method according to claim 1, wherein axial movement of said stator core is restricted by placing annular brace portions in a state of surface contact with outer circumferential portions of two axial end surfaces of said stator core in said step of shaping said two axial end portions of said outer circumferential surface of said stator core.

4. A dynamoelectric stator manufacturing method according to claim 1, wherein said step of preparing said cylindrical stator core further comprising steps of;
    preparing a rectangular parallelepiped laminated body by laminating said thin magnetic plate, and consolidating and integrating said laminated thin magnetic plate by welding said laminated body so as to extend from a first end portion to a second end portion in a direction of lamination; and
    bending into a cylindrical shape said laminated body in which said laminated thin magnetic plate has been consolidated and integrated, and integrating said bent laminated body by abutting and welding end surfaces thereof.

5. A dynamoelectric stator manufacturing method according to claim 4, wherein said laminated body is bent into a cylindrical shape after said stator winding has been mounted to said laminated body in which said laminated thin magnetic plate has been consolidated and integrated.

* * * * *